United States Patent [19]

Boivin et al.

[11] Patent Number: 4,678,834

[45] Date of Patent: Jul. 7, 1987

[54] BLENDS OF POLYOLEFINS WITH POLYMERS CONTAINING REACTIVE AGENTS

[75] Inventors: Daniel W. Boivin, Toronto; Ronald A. Zelonka, Kingston, both of Canada

[73] Assignee: Du Pont Canada Inc., Mississauga, Canada

[21] Appl. No.: 756,223

[22] Filed: Jul. 18, 1985

[30] Foreign Application Priority Data

Jun. 27, 1985 [CA] Canada .................................. 485651

[51] Int. Cl.$^4$ ........................ C08L 23/26; C08K 5/14; C08J 3/24; C08J 5/00
[52] U.S. Cl. .................................... 525/74; 525/78; 525/177; 525/184; 525/193; 525/194; 525/197; 525/211; 525/221; 525/222; 525/239; 525/240; 523/205
[58] Field of Search ............... 525/193, 194, 227, 197, 525/936, 74, 78, 177, 184

[56] References Cited

U.S. PATENT DOCUMENTS

| | | | |
|---|---|---|---|
| 3,433,573 | 3/1969 | Holladay et al. | 525/227 |
| 3,657,379 | 4/1972 | Hilbelink et al. | 525/936 |
| 3,868,433 | 2/1975 | Bartz et al. | 525/193 |
| 3,966,672 | 6/1976 | Gaylord | 525/207 |
| 4,234,656 | 11/1980 | Amenbal et al. | 525/194 |
| 4,440,899 | 4/1984 | Peerlkamp | 525/240 |
| 4,440,916 | 4/1984 | Waters et al. | 525/177 |
| 4,612,155 | 9/1986 | Wong et al. | 525/197 |

FOREIGN PATENT DOCUMENTS

| | | | |
|---|---|---|---|
| 087210 | 8/1983 | European Pat. Off. | |
| 2093043 | 8/1982 | United Kingdom | 525/240 |

*Primary Examiner*—Carman J. Seccuro

[57] ABSTRACT

A polyolefin blend comprising, in physical admixture, a major portion of particles of a polyethylene and a minor portion of particles of a composition of a thermoplastic second polymer, is disclosed. The polyethylene is selected from the group consisting of homopolymers of ethylene and copolymers of ethylene and at least one $C_4$–$C_{10}$ higher alpha-olefin, and the second polymer is a normally solid thermoplastic polymer having a melting point of less than 185° C. and a shear viscosity that is not more than that of the polyethylene when measured at 200° C. and a shear rate of 400 sec$^{-1}$ with the proviso that the second polymer is not a homopolymer or copolymer derived solely from hydrocarbon alpha-olefins having 2–10 carbon atoms. Examples of second polymers are (a) homopolymers and copolymers of unsaturated hydrocarbons in which at least one monomer is other than a $C_2$–$C_{10}$ alpha-olefin, e.g. ethylene/propylene elastomers, polystyrene and styrene/butadiene/styrene copolymers, (b) copolymers of ethylene with ethylenically unsaturated carboxylic acids and anhydrides, and esters thereof, and (c) modified polymers e.g. chlorinated polyethylene, grafted and ionomeric polymers. The composition of the second polymer contains a reactive agent that is capable of reacting with polyolefins that are in a molten state, such agents being cross-linking agents and/or modifying agents. In an alternative embodiment, the polyethylene may be more broadly defined as being a homopolymer or copolymer of hydrocarbon alpha-olefins having 2–10 carbon atoms. The blends may be used in a wide variety of processes, including blow-moulding processes, film and pipe extrusion processes, sheet thermoforming processes and rotational moulding processes.

30 Claims, No Drawings

BLENDS OF POLYOLEFINS WITH POLYMERS CONTAINING REACTIVE AGENTS

BACKGROUND OF THE INVENTION

1. Field of the Invention

The present invention relates to polyolefin blends and in particular to a physical admixture of a major portion of particles of an ethylene polymer with a minor portion of particles of a composition of another polymer and a reactive agent that is capable of reacting with polyolefins in the molten state, such reactive agent being a cross-linking agent and/or a modifying agent and being further defined hereinbelow.

2. Description of the Prior Art

Polymers of ethylene, for example, homopolymers of ethylene and copolymers of ethylene and higher alpha-olefins, are used in large volumes for a variety of end-uses, for example, in the form of film, fibres, moulded or thermoformed articles, pipe, coatings and the like.

Polyolefin compositions as offered for sale and/or used in such end-uses often contain reactive and/or non-reactive agents to modify or stabilize the polymer during processing or during use of articles fabricated from the compositions. Typical reactive agents include cross-linking agents and certain unsaturated compounds. Typical non-reactive agents include antioxidants and other stabilizers, nucleation agents and additives that affect the slip or blocking characteristics of products or the release of products from moulds used in fabrication processes. It is important that the incorporation of agents into polyolefin compositions be carried out so that the resultant composition has uniform properties.

Polymers having properties that are commercially-acceptable in a variety of end-uses are known. However, improvements in some polymer properties could lead to improved products and/or use of the polymers in additional end-uses. For instance, one method of improving the end-use characteristics of an article rotationally moulded from polymers of ethylene is to incorporate a cross-linking agent, for example, an organic peroxide, into the polymer composition. In the rotational moulding of a composition containing an organic peroxide, the polymer flows to coat the inside of the mould and then the cross-linking agent causes crosslinking of the polymer so as to increase the molecular weight of the polymer, thereby improving end-use properties of the resultant article. Cross-linkable compositions especially adapted for rotational moulding end-uses are disclosed in European Patent Publication No. 0 087 210 of G. White, published Aug. 31, 1983.

Cross-linkable compositions may also be used in other end-uses to obtain improvements in product properties; the cross-linking of the polymer will tend to affect melt characteristics of the polymer under low shear rate processing conditions. One example of the use of partial cross-linking so as to obtain an improvement in film properties is disclosed in Canadian Patent No. 1 123 560 of D. A. Harbourne, which issued May 18, 1982.

Techniques for the incorporation of agents into polyolefins are well known in the art. Non-reactive agents, especially stabilizing agents, are frequently incorporated into molten polymer during the process for the manufacture of the polymer. Reactive and non-reactive agents may also be incorporated into polymers by melt blending techniques in which the agent is metered into or otherwise added to molten polymer during extrusion of the polymer into pellets or a fabricated article.

It is important in the addition of agents that the agent be uniformly distributed throughout the polymer. With non-reactive agents, however, the uniformity of the distribution of the agent is normally less critical than with reactive agents. For example, the requirements for a slip agent or a stabilizer may be less critical than for a cross-linking agent. The cross-linking of a polymer increases the molecular weight of the polymer. Thus, in order to obtain a product of uniform properties, especially properties dependent on molecular weight, it is important that the cross-linking of the polymer be carried out in a uniform manner. If the cross-linking is not uniform, the resultant product may, for example, have areas of weakness due to either insufficient or excessive cross-linking of the polymer or have gel particles resulting from excessive cross-linking of the polymer, such gel particles resulting in unacceptable visual appearance and/or areas of weakness in the product. Some fabrication processes, for example blow moulding of bottles and the manufacture of sheet and film, may be more sensitive to non-uniform product properties than other processes. In order to obtain uniform product properties, it has been necessary to use expensive and/or complex processes to incorporate reactive agents into polymers, including special handling facilities and special extruder screw designs.

The blending of organic peroxide with molten polyethylene is disclosed in U.S. Pat. No. 3 182 033 of R. S. Gregorian, which issued May 4, 1965 and in Canadian Patent No. 957 473 of H. J. Cook, which issued Nov. 12, 1974. D. A. Alia disclosed in U.S. Pat. No. 4 197 381, which issued Apr. 8, 1980, the blending of crystalline polymers and amorphous elastomeric polymers in the production of vulcanizable compositions intended for thermoset applications. The blending of reactive agents into polyethylene by means of a physical blend of polyethylenes of different properties is disclosed in the application of G. White filed concurrently herewith.

SUMMARY OF THE INVENTION

A blend of polymers capable of being used to incorporate reactive agents into polyolefins in a uniform and more economical manner has now been found.

Accordingly, the present invention provides a blend comprising, in physical admixture, a major portion of particles of a polyolefin and a minor portion of particles of a composition of a second polymer, in which the polyolefin is selected from the group consisting of homopolymers and copolymers of hydrocarbon alpha-olefins having 2-10 carbon atoms, and mixtures thereof, said second polymer being a normally solid thermoplastic polymer having a melting point of less than 185° C. and having a shear viscosity that is not more than 50% of that of said polyolefin when measured at 200° C. and a shear rate of 400 sec$^{-1}$ with the proviso that said second polymer is not a homopolymer or copolymer derived solely from hydrocarbon alpha-olefins having 2-10 carbon atoms, said composition being a composition of the second polymer and a reactive agent selected from the group consisting of cross-linking agents and modifying agents, and mixtures thereof, said reactive agent being capable of reacting with said polyolefin in a molten state.

In a preferred embodiment of the blends of the present invention, the polyolefin is a polyethylene selected from the group consisting of homopolymers of ethylene and copolymers of ethylene and at least one $C_4$–$C_{10}$ higher alpha-olefin, and mixtures thereof.

In another embodiment, the second polymer is selected from the group consisting of:

A. homopolymers and copolymers of unsaturated hydrocarbons with the provisos that (i) said homopolymer is not a homopolymer of a $C_2$–$C_{10}$ alpha-olefin and (ii) said copolymer has at least one monomer that is not a $C_2$–$C_{10}$ alpha-olefin;

B. copolymers of an alpha-olefin having the formula R—CH=CH$_2$, where R is a radical selected from the class consisting of hydrogen and alkyl radicals having from 1 to 8 carbon atoms, with alpha,beta-ethylenically unsaturated acids having from 3 to 8 carbon atoms, and esters and anhydrides thereof, the moieties being randomly or nonrandomly distributed in the polymer chain and being 0.5–50% by weight of the copolymer, any other copolymerized monomer being monoethylenically unsaturated;

C. ionomeric polymers derived from the copolymers of (B);

D. graft copolymers obtained by grafting 0.1 to 5 percent by weight of alpha-beta unsaturated carboxylic acids having 3 to 8 carbon atoms or an unsaturated carboxylic acid anhydride onto a preformed backbone derived from ethylene or ethylene and $C_3$ to $C_8$ alpha-olefin, in which polyolefin backbone any other optionally copolymerized monomer component is monoethylenically unsaturated;

E homopolymers of R′—CH=CH—R′ where each R′ is independently selected from the group consisting of H, Cl and F, with the proviso that at least one R′ is other than H, copolymers of ethylene with R′—CH=CH—R′ and chlorinated homopolymers and copolymers of $C_2$–$C_{10}$ hydrocarbon alpha-olefins;

F. saturated polyamides and polyesters;

G. homopolymers of vinyl esters of aliphatic carboxylic acids having 3 to 8 carbon atoms, copolymers of ethylene with such esters, and partially saponified polymers thereof; and H. copolymers as described in (B) in which all or part of the alpha-olefin has been replaced with styrene or alkyl styrene, where the alkyl group has 1 or 2 carbon atoms.

In addition, the present invention provides a process for the manufacture of articles from a polyolefin and a reactive agent capable of reacting with the polyolefin in a molten state, comprising feeding to melt processing apparatus a blend comprising, in physical admixture, a major portion of particles of a polyolefin and a minor portion of particles of a composition of a second polymer, said polyolefin being selected from the group consisting of homopolymers and copolymers of hydrocarbon alpha-olefins having 2–10 carbon atoms, and mixtures thereof, said second polymer being a normally solid thermoplastic polymer having a melting point of less than 185° C. and a shear viscosity that is not more than 50% of that of said polyolefin when measured at 200° C. and a shear rate of 400 sec$^{-1}$ with the proviso that said second polymer is not a homopolymer or copolymer derived solely from hydrocarbon alpha-olefins having 2–10 carbon atoms, said composition being a composition of the second polymer and a reactive agent selected from the group consisting of cross-linking agents and modifying agents, and mixtures thereof, melting and admixing said blend and forming an article from the resultant blend. The invention also provides processes for the manufacture of articles from the other blends described herein.

DETAILED DESCRIPTION OF THE INVENTION

The polyolefin of the blends of the present invention is particularly described herein with reference to such polyolefins being a homopolymer of ethylene and/or a copolymer of ethylene and a minor amount of at least one $C_4$–$C_{10}$ higher alpha-olefin, for example a copolymer of ethylene and a minor amount of butene-1, hexene-1 and/or octene-1. It is to be understood, however, that the polyolefin may be broadly defined as being homopolymers or copolymers of hydrocarbon alpha-olefins having 2–10 carbon atoms. Techniques for the manufacture of such polymers are known in the art.

As noted above, the invention is particularly defined with reference to the polyolefins being homopolymers and copolymers of ethylene.

The characteristics of the polyethylene, for example, the density and melt index of the polymer, will depend to a large extent on the intended end-use of the resultant products but, in embodiments, the density may range from about 0.890 g/cm$^3$ to about 0.970 g/cm$^3$ and the melt index, as measured by the method of ASTM D-1238 (condition E), may range up to about 100 dg/min. For example, polymers intended for film and sheet end-uses tend to have melt indices of less than about 10 dg/min whereas polymers intended for moulding end-uses tend to have higher values of melt index. The ranges of density and melt index of polyolefins that are useful for various types of products are known in the trade.

The characteristics of the thermoplastic second polymer differ from those described above for the polyolefin. Firstly, the second polymer is a normally solid thermoplastic polymer having a melting point of less than 185° C., especially less than 175° C., and a shear viscosity that is not more than 50% of that of said polyethylene (polyolefin) when measured at 200° C. and a shear rate of 400 sec$^{-1}$, with the proviso that the second polymer is not a homopolymer or copolymer derived solely from hydrocarbon alpha-olefins having 2–10 carbon atoms. In preferred embodiments, the second polymer is selected from the group consisting:

A. homopolymers and copolymers of unsaturated hydrocarbons with the provisos that (i) said homopolymer is not a homopolymer of a $C_2$–$C_{10}$ alpha-olefin and (ii) said copolymer has at least one monomer that is not a $C_2$–$C_{10}$ alpha-olefin;

B. copolymers of an alpha-olefin having the formula R—CH=CH$_2$, where R is a radical selected from the class consisting of hydrogen and alkyl radicals having from 1 to 8 carbon atoms, with alpha,beta-ethylenically unsaturated acids having from 3 to 8 carbon atoms, and esters and anhydrides thereof, such acids being mono-, di, or polycarboxylic acids, the moieties being randomly or non-randomly distributed in the polymer chain and being 0.5–50% by weight of the copolymer, any other copolymerized monomer being monoethylenically unsaturated;

C. ionomeric polymers derived from the copolymers of (B);

D. graft copolymers obtained by grafting 0.1 to 5 percent by weight of alpha-beta unsaturated carboxylic acids having 3 to 8 carbon atoms or an unsaturated carboxylic acid anhydride onto a preformed backbone derived from ethylene or ethylene and $C_3$ to $C_8$ alpha-olefin, in which polyolefin backbone any other optionally copolymerized monomer component is monoethylenically unsaturated;

E. homopolymers of R'—CH=CH—R' where each R' is independently selected from the group consisting of H, Cl and F, with the proviso that at least one R' is other than H, copolymers of ethylene with R'—CH=CH—R' and chlorinated homopolymers and copolymers of $C_2$-$C_{10}$ hydrocarbon alpha-olefins;

F. saturated polyamides and polyesters;

G. homopolymers of vinyl esters of aliphatic carboxylic acids having 3 to 8 carbon atoms, copolymers of ethylene with such esters, and partially saponified polymers thereof; and H. copolymers of (B) in which all or part of the alpha-olefin has been replaced with styrene or alkyl styrene, where the alkyl group has 1 or 2 carbon atoms.

In particularly preferred embodiments, the second polymer is selected from the group consisting of:

(i) ethylene/propylene elastomers, especially such elastomers that are known as EPDM rubbers, e.g. Nordel* elastomers;

(ii) polystyrene, e.g. Polysar* polystyrene;

(iii) block copolymers e.g. styrene/butadiene/styrene copolymers, e.g. Kraton* elastomers;

(iv) ethylene/acrylic acid or ethylene/methacrylic acid copolymers, e.g. Nucrel* copolymers;

(v) ethylene/vinyl acetate copolymers e.g. Elvax* copolymers; and (vi) ionomeric polymers derived from ethylene/acrylic acid or ethylene/methacrylic acid copolymers e.g. Surlyn* ionomers.

* denotes trade mark

The second polymer is a normally solid polymer and includes materials frequently referred to as solid waxes but does not include materials that are liquids at ambient temperatures and pressures; the blends of the invention are physical admixtures and are therefore capable of physical separation into the respective components at ambient temperature.

The second polymer, when in a molten state has a lower shear viscosity than the polyethylene in a molten state, especially a shear viscosity that is not more than 50% of that of the polyethylene. Preferably, the shear viscosity of the second polymer is not more than about 30%, especially 5-15%, of the shear viscosity of the polyethylene. As used herein, shear viscosity is determined at 200° C. at a shear rate of 400 sec$^{-1}$ The second polymer contains a reactive agent selected from the group consisting of cross-linking agents and modifying agents, and mixtures thereof. As used herein, the expression "reactive agent" refers to an agent that undergoes a chemical reaction at temperatures at which polyethylene is in a molten state. It is to be understood, however, that the rate of chemical reaction may not be significant until the temperature of the molten polyethylene is substantially above the melting point of the polyethylene. For example, it is known that cross-linking agents for polyethylene are usually selected so that the cross-linking reaction occurs above the melting point of the polymer e.g. at or near normal melt processing temperatures. It is preferred that the reaction temperature be such that adequate mixing of polymer and reactive agent may be achieved prior to extensive reaction between polymer and reactive agent; the half-life of a cross-linking agent is usually known over a range of temperatures and may be used to assist in selection of a cross-linking agent suitable for an intended end-use. It is to be understood that the reactive agent may be more than one chemical compound or species and, in that event, part of the composition of the second polymer may contain one reactive agent and another part of the composition of the second polymer may contain a second reactive agent. It is to be further understood that if the reactive agent is more than one chemical compound or species, then each such reactive agent may be capable of reacting with polyethylene that is in a molten state and/or one such reactive agent may be capable of reacting with another such reactive agent.

In the event that the reactive agent is a cross-linking agent e.g. an organic peroxide, the polyethylene may, but normally will not, contain organic peroxide. However, it may under some circumstances be desirable to incorporate portions of the cross-linking formulation into the polyethylene. For example, if the cross-linkable composition is to be comprised of both an organic peroxide and a co-curing agent, as is disclosed in the aforementioned publication of G. White, it might be advantageous to admix the co-curing agent with the polyethylene and to admix the organic peroxide with the second polymer. Such an incorporation of the co-curing agent into the polyethylene may aid in the fabrication of a uniform product. In any event, the polyethylene will often contain non-reactive agents known to be incorporated into polyethylene including antioxidants and other stabilizers, pigments and the like, it being understood that some so-called non-reactive agents useful in polyethylene may have detrimental effects on cross-linking or other reactive agents useful with polyethylene and as such will likely not be used in combination with such cross-linking or other reactive agents.

For blends containing cross-linking agents, the preferred cross-linking agent is an organic peroxide, especially a bis(tert. alkyl peroxy alkyl) benzene, dicumyl peroxide or acetylenic diperoxy compound. Other organic peroxides are known to those skilled in the art, including t-butyl hydroperoxide and di-t-butyl peroxide. 2,5-Dimethyl-2,5 bis(tert. butyl peroxyisopropyl)-benzene is the preferred organic peroxide and is available commercially under the trade mark Vulcup from Hercules Incorporated. As an alternative, the cross-linking agent may be 2,5-dimethyl-2,5-di(t-butylperoxy)hexyne-3 which is available commercially under the trade mark Lupersol 130 from Lucidol Division of Pennwalt Corporation. In an embodiment, the composition of the second polymer may be similar to compositions disclosed in the aforementioned publication of G. White except that the polymer would be as defined herein. While the amount of cross-linking agent in the second polymer may be varied over a wide range it may be preferable not to have a high concentration of cross-linking agent in the second polymer and to then admix only a small amount of the second polymer with the polyethylene. In that event, problems may be experienced in mixing the relatively high concentration of cross-linking agent in the second polymer in a uniform manner into the polyethylene. If the cross-linking agent is an organic peroxide, it is preferred that less than 4% by weight of peroxide be present in the second polymer and preferably 0.2-1.0% by weight of peroxide.

As noted above, a co-curing agent may be incorporated into the polyethylene or second polymer i.e. either separately from or admixed with cross-linking agent. Examples of co-curing agents include triallyl cyanurate, triallyl isocyanurate and 1,2-polybutadiene.

The reactive agent may be a modifying agent, which may be used either alone or, usually, in combination with an initiator. Examples of modifying agents include unsaturated organic acids, and derivatives thereof, e.g. acrylic acid, methacrylic acid, maleic acid, fumaric acid, itaconic acid and crotonic acid, maleic anhydride, crosslinkable silane compounds e.g. vinyltrimethoxysilane, vinyltriethoxysilane, vinyltris(2-methoxyethoxy) silane and vinylmethyldimethoxysilane, sulphur trioxide-trimethylamine, and other compounds capable of being reacted with molten polyethylene. The modifying agents will usually be used in combination with an initiator especially a cross-linking agent e.g. an organic peroxide. With some modifying agents, other initiators are known e.g. styrene acts as an initiator for maleic anhydride. The modifying agent and initiator may be separately admixed with the second polymer as compositions thereof. Under some processing conditions, modifying agents may react with polyethylene in the substantial absence of an added initiator. For example, it is known to thermally react maleic anhydride with polyethylene at temperatures of at least about 375° C.

The polyethylenes of the blend may contain a stabilizing agent e.g. an antioxidant or an ultra violet stabilizer. Examples of antioxidants are hindered phenolic antioxidants e.g. octadecyl-3,5-di-tert.butyl-4-hydroxy cinnamate and tetrakis-methylene-3-(3',5'-ditert.-butyl-4-hydroxyphenyl) propionate methane. Hindered phenolic antioxidants may be used in combination with a phosphite antioxidant e.g. di(stearyl)-pentaerythritol diphosphite, tris di-tert.-butyl phenyl phosphite, dilauryl thiodipropionate and bis(2,4-tert.-butylphenyl) pentaerythritol diphosphite. Examples of ultra violet stabilizers are 2-hydroxy-4-n-octoxybenzophenone, 2-(3'-tert.butyl-2'-hydroxy-5'-methylphenyl)-5-chlorobenzotriazole and bis-(2,2,6,6-tetramethyl-4-piperindyl)sebacate. Moreover, the polyethylenes of the blend may contain slip agents, anti-blocking agents, anti-static agents, mould release agents, nucleating or other processing aids or the like. Examples of slip agents are erucamide and stearamide, of anti-static agents are bis(-hydroxyethyl) tallow amine and glycerol monooleate, of anti-blocking agents are silica and mica and of mould release agents are calcium stearate and zinc stearate. Examples of nucleating agents or other processing aids are talc, silica or the like.

As noted above, stabilizing or other so-called non-reactive agents may have detrimental effects on cross-linking or other reactive agents and for that reason it may be preferable not to use certain combinations of agents, as will be understood by those skilled in the art.

The ratio of the polyethylene to the second polymer may be varied over a wide range, from about 10:1 to about 400:1 and especially about 50:1 to about 100:1. The ratio selected will depend on a variety of factors, including the amount of reactive agent (or of additional reactive agent) to be incorporated into the blend, the type of reactive agent, the need for a uniform product, the type of processing that the resultant blend is to be subjected to and the mixing capabilities of apparatus used therein and the like. With regard to the mixing capabilities of the apparatus, twin-screw extruders may be more effective than single screw extruders.

The amount of reactive agent in the blend of the present invention will depend, in particular, on the type of reactive agent and the intended end-use of the blend. Thus, the amount could vary, depending on such other factors, from a few parts per million (ppm) in the blend to in excess of one per cent, by weight. Such amounts will be understood by those skilled in the art.

In the event that the reactive agent is a cross-linking agent, the polyethylene and second polymer may be selected and admixed so that the amount of cross-linking agent in the blend is in the range of about 25 ppm to about 1000 ppm by weight of the blend. The amount of crosslinking agent in the blend will depend primarily on the intended end-use for the blend. Blends intended for the fabrication of highly cross-linked products will have relatively high levels of cross-linking agents. On the other hand, a small amount of cross-linking agent may be present in the blend so as to effect only a partial cross-linking of the resultant product.

The particles of the polyethylene and second polymer may be any convenient shape and size and may for example be granules, powder, pellets or the like. Such forms are commercially available forms of polyethylene and polymers and/or may be obtained by known techniques e.g. grinding, melt pelletization and the like. However, it is preferred that the particles of the polyethylene be of substantially the same size as the particles of the composition of the second polymer. As the difference in size between the particles increases, so does the possibility that the two types of particles will become separated from one another during storage, transportation or other handling of the blend; such differences may be less critical if the blend is fed to an extruder shortly after preparation thereof.

The composition of the second polymer may be produced by techniques known in the art for incorporating agents into polymers. Such methods include melt blending, coating and extrusion, and injection of the agent into molten polymer. If the reactive agent is a modifying agent or especially a cross-linking agent, the reactive agent should be incorporated into the polymer in a manner that does not result in premature reaction with the polymer, as in known in the art.

The blends of the present invention may be used for the incorporation of reactive agents into polyethylene, especially in a versatile and economic manner. The resultant blends may be used in a wide variety of end-uses, as is known for polyethylene. Such uses include blow-moulding processes, film and pipe extrusion processes, sheet thermoforming processes and rotational moulding processes. Apparatus used in such processes is referred to herein as melt processing apparatus. In particularly preferred embodiments, the blends are used in the manufacture of film in a blown film process. Such a use of the blends may result in substantial increases in the rate of production of film of acceptable quality. However, for any particular combination of apparatus, polymer composition and processing conditions, there may be an optimum level of cross-linking agent above which increases in the rate of film production, if any, may be at the detriment of film quality.

The present invention is illustrated by the following examples.

EXAMPLE I

In a series of runs, pellets of a polymer were coated with 2500 ppm of Lupersol 130 organic peroxide cross-linking agent. The resultant coated pellets were physically admixed, at a 2 % level, with SCLAIR 13J4 polyethylene, an ethylene/octene-1 copolymer having a density of 0.930 g/cm$^3$ and a melt index of 1.0 dg/min. to give blends of the present invention. The resultant blends were fed to the extruder of a blown film process;

the single screw extruder was equipped with the most efficient mixing screw that was available. The blown film process was operated with a melt temperature of 205°-210° C.

The film obtained was inspected for quality. The results obtained are shown in Table I. It was found that film homogeneity was poor when the shear viscosity of the second polymer was more than 50% of that of SCLAIR 13J4 polyethylene and/or the melting point of the second polymer exceeded 185° C. It is known that with less efficient mixing screws, the viscosity of the second polymer is more critical.

EXAMPLE II

Using the procedure of Example I, polymer pellets were coated with 2500 ppm of Lupersol 130 organic peroxide cross-linking agent and 2500 ppm of triallyl isocyanurate co-curing agent. The polymer was Nucrel ® ethylene/-methacrylic acid. The coated pellets were physically admixed with Sclair 13J4 polyethylene, and ethylene/octene-1 copolymer having a density of 0.930 g/cm3 and a melt index of 1.0 dg/min. The resultant blends were extruded into films in a blown film process.

The results are shown in Table II.

TABLE I

| Run No. | Polymer | Viscosity* (poise) | M.P. (C) | Film Melt Strength** | Comments |
|---|---|---|---|---|---|
| 1 | Control (13J4 polyethylene | 9000 | <130 | 0.14 | clear film, low melt strength |
| 2 | SBS | 2000 | <150 | 0.74 | good melt strength film very hazy |
| 3 | EVA | 2000 | 100 | 0.72 | good melt strength film clear |
| 4 | polystyrene | 2500 | 130 | 0.84 | good melt strength film opaque |
| 5 | ionomer | 880 | 83 | 0.64 | good melt strength film clear |
| 6 | maleated PP | 4 | 175 | 0.42 | adequate melt strength film very clear |
| 7 | E/MA | 2000 | <150 | 1.2 | good melt strength film clear |
| 8 | EPDM | 8000 | <150 | 1.6 | very high melt strength film hazy with low tear strength |
| 9 | CPE | 10 000 | <150 | 0.6 | film very hazy, poor quality with large gel particles. |
| 10 | EVOH | 2 700 | 189 | no data | not processable, large gel particles, holes |
| 11 | elastomer | 3 800 | 211 | no data | not processable, large gel particles, holes |

Note: Runs 1 and 8-11 are comparative runs.
*For Runs 2-4 and 8, viscosity was dynamic viscosity measured at 200° C., 400 radians/sec. The viscosity for the polyethylene was 9000 poise. For Run 11, the viscosity was measured at 220° C.; the polyethylene viscosity was 8000 poise.
For Run 6, viscosity was measured on a Brookfield Thermosel (trade mark) viscometer at 190° C.
For Runs 5, 7 and 8, viscosity was measured by capillary at 200° C. and 400 sec$^{-1}$. The viscosity for the polyethylene was 6000 poise. For Run 10, the viscosity was measured at 220° C.; the polyethylene viscosity was 5300 poise.
**Melt strength numbers are dimensionless, being based on the time a standard parison weight will hang from a die at 190° C.
Run 1 ... Control was Sclair 13J4 polyethylene;
Run 2 ... SBS = styrene/butadiene/styrene copolymer = Kraton* D3202 elastomer from Shell Canada Chemical Company, density 1.000 g/cm$^3$, melt index 14.0 dg/min.
Run 3 ... EVA = ethylene/vinyl acetate copolymer; Elvax* 350 from E. I. du Pont de Nemours and Company, density 0.948 g/cm$^3$, melt index 19.0 dg/min.
Run 4 ... polystyrene = Polysar* 220 from Polysar Limited, density 1.04 g/cm$^3$, melt index (ASTM D-1238(condition G)) 19.0 dg/min.
Run 5 ... ionomer = ethylene/methacrylic acid ionomer, Surlyn 9970 from E. I. du Pont de Nemours and Company, density 0.95 g/cm$^3$, melt index 14.0 dg/min.
Run 6 ... maleated PP = maleated polypropylene; Epolene* 43 from Eastman Chemical Products, Inc., density 0.934 g/cm$^3$, melt index >2000 dg/min.
Run 7 ... E/MA = ethylene/methacrylic acid copolymer containing 9% methacrylic acid, density 0.934 g/cm$^3$, melt index 10.0 dg/min.
Run 8 ... EPDM = ethylene/propylene/diene elastomer; a blend of 2 parts terpolymer (64% ethylene, 32% propylene, 4% 1,4-hexadiene) with 1 part polyethylene (density 0.96 g/cm$^3$, melt index 2.8 dg/min), density of 0.88-0.894 g/cm$^3$, melt flow index (230° C.) 0.4-1.5 dg/min.
Run 9 ... CPE = chlorinated polyethylene; CPE 3623 from Dow Chemical Co., density 1.16 g/cm$^3$.
Run 10 ... EVOH = ethylene/vinyl alcohol copolymer; Soarnol* ZL from Nippon Gohsei Osaka, Japan, melt flow index = 20 dg/min at 220° C.
Run 11 ... elastomer = polyester elastomer; block copolymer of 60% butylene terephthalate short chain ester units and 40% polytetramethylene ether (Mw 1000) terephthalate long chain ester units, melt flow index = 20 dg/min. at 220° C.
*denotes trade mark

TABLE II

| Run No. | Second Polymer** | Amount of Second Polymer (%) | Comments |
|---|---|---|---|
| 12 | A | 2 | good melt strength, film clear |
| 13 | B | 2 | good melt strength, film clear |
| 14 | C | 2 | good melt strength, film clear |
| 15 | C | 3 | very high melt strength, film very hazy |
| 16 | C | 4 | Bubble not stable, melt strength too high film quality poor |

**A ... terpolymer of ethylene with 10% methacrylic acid and 10% isobutyl acrylate, density of 0.94 g/cm$^3$ and melt index of 21 dg/min.
B ... copolymer of ethylene with 15% methacrylic acid, density of 0.97 g/cm$^3$ and melt index of 21 dg/min.
C ... copolymer of ethylene with 9% methacrylic acid, density of 0.934 g/cm$^3$ and melt index of 10 dg/min.

We claim:

1. A mixture comprising, in physical admixture, a major portion of particles of a polyethylene and a minor portion of particles of a composition of a second polymer, in which the polyethylene is selected from the group consisting of homopolymers of ethylene and copolymers of ethylene and at least one $C_4$–$C_{10}$ higher alpha-olefin, and mixtures thereof, and said second polymer is a normally solid thermoplastic polymer having a melting point of less than 185° C. and a shear viscosity that is not more than 30% of that of said polyethylene when measured at 200° C. and a shear rate of 400 sec$^{-1}$, with the proviso that said second polymer is not homopolymer or copolymer derived solely from hydrocarbon alpha-olefin having 2-10 carbon atoms, and said composition being a composition of the second polymer and a cross-linking agent said cross-linking agent being capable of reacting with said polyethylene in a molten state, the ratio of the polyethyelene to the second polymer being in the range of from 10:1 to 100:1.

2. The mixture of claim 1 in which the second polymer is selected from the group consisting of:
   A. homopolymers and copolymers of unsaturated hydrocarbons with the provisos that (i) said homopolymer is not a homopolymer of a $C_2$–$C_{10}$ alpha-olefin and (ii) said copolymer has at least one monomer that is not a $C_2$–$C_{10}$ alpha-olefin;
   B. copolymers of an alpha-olefin having the formula R—CH=$CH_2$, where R is a radical selected from the class consisting of hydrogen and alkyl radicals having from 1 to 8 carbon atoms, with alpha,beta-ethylenically unsaturated acids having from 3 to 8 carbon atoms, and esters and anhydrides thereof, the moieties being randomly or non-randomly distributed in the polymer chain and being 0.5–50% by weight of the copolymer, any other copolymerized monomer being monoethylenically unsaturated;
   C. ionomeric polymers derived from the copolymers of (B);
   D. graft copolymers obtained by grafting 0.1 to 5 percent by weight of alpha-beta unsaturated carboxylic acids having 3 to 8 carbon atoms or an unsaturated carboxylic acid anhydride onto a preformed backbone derived from ethylene or ethylene and $C_3$ to $C_8$ alpha-olefin, in which polyolefin backbone any other optionally copolymerized monomer component is mono-ethylenically unsaturated;
   E. homopolymers of R'—CH=CH—R' where each R' is independently selected from the group consisting of H, Cl and F, with the proviso that at least one R' is other than H, copolymers of ethylene with R'—CH=CH—R' and chlorinated homopolymers and copolymers of $C_2$–$C_{10}$ hydrocarbon alpha-olefins;
   F. saturated polyamides and polyesters;
   G. homopolymers of vinyl esters of aliphatic carboxylic acids having 3 to 8 carbon atoms, copolymers of ethylene with such esters, and partially saponified polymers thereof; and
   H. copolymers of (B) in which all or part of the alpha-olefin has been replaced with styrene or alkyl styrene, where the alkyl group has 1 or 2 carbon atoms.

3. The mixture of claim 2 in which the shear viscosity of the second polymer is 5–15% of that of the polyolefin.

4. The blend of claim 2 in which the second polymer is a polymer (A).

5. The mixture of claim 2 in which the second polymer is a polymer of (B).

6. The mixture of claim 2 in which the second polymer is a polymer of (C).

7. The mixture of claim 2 in which the second polymer is a polymer of (D).

8. The mixture of claim 2 in which the second polymer is a polymer of (E).

9. The mixture of claim 2 in which the second polymer is a polymer of (F).

10. The mixture of claim 2 in which the second polymer is a polymer of (G).

11. The mixture of claim 2 in which the second polymer is a polymer of (H).

12. The mixture of claim 2 in which the ratio of the polyethylene to the second polymer is in the range of 50:1 to 100:.

13. A process for the manufacture of articles from a mixture comprising, in physical admixture, a major portion of particles of a polyethylene and a minor portion of particles of a composition of a second polymer containing a cross-linking agent capable of reacting with the polyethylene in a molten state, said process comprising feeding to melt fabricatIon apparatus said mixture, said polyethylene being selected from the group consisting of homopolymers of ethylene and copolymers of ethylene and at least one $C_4$–$C_{10}$ higher alpha-olefin, and mixtures thereof, and said second polymer being a normally solid thermoplstic polymer having a melting point of less than 185? C and a shear viscosity that is not more than 30% of that of said polyethylene when measured at 200° C. and a shear rate of 400 $sec^{-1}$, with the proviso that said second polymer is not a homopolymer or copolymer derived solely from hydrocarbon alpha-olefins having 2-10 carbon atoms, the ratio of the polyethylene to the second polymer being in the range of from 10:1 to 100:1, by melting and admixing said mixture in said melt fabrication apparatus and forming an article from the resulting blend.

14. The process of claim 13 in which the second polymer is selected from the group consisting of:
   A. homopolymers and copolymers of unsaturated hydrocarbons with the provisos that (i) said homopolymer is not a homopolymer of a $C_2$–$C_{10}$ alpha-olefin and (ii) said copolymer has at least one monomer that is not a $C_2$–$C_{10}$ alpha-olefin;
   B. copolymers of an alpha-olefin having the formula R—CH=$CH_2$, where R is a radical selected from the class consisting of hydrogen and alkyl radicals having from 1 to 8 carbon atoms, with alpha,beta-ethylenically unsaturated acids having from 3 to 8 carbon atoms, and esters and anhydrides thereof, the moieties being randomly or non-randomly distributed in the polymer chain and being 0.5–50% by weight of the copolymer, any other copolymerized monomer being monoethylenically unsaturated;
   C. ionomeric polymers derived from the copolymers of (B);
   D. graft copolymers obtained by grafting 0.1 to 5 percent by weight of alpha-beta unsaturated carboxylic acids having 3 to 8 carbon atoms or an unsaturated carboxylic acid anhydride onto a preformed backbone derived from ethylene or ethylene and $C_3$ to $C_8$ alpha-olefin, in which polyolefin backbone any other optionally copolymerized monomer component is mono-ethylenically unsaturated;
   E. homopolymers of R'—CH=CH—R' where each R' is independently selected from the group consisting of H, Cl and F, with the proviso that at least one R' is other than o H, copolymers of ethylene with R'—CH=CH—R' and chlorinated homopolymers and copolymers of $C_2$–$C_{10}$ hydrocarbon alpha-olefins;
   F. saturated polyamides and polyesters;
   G. homopolymers of vinyl esters of aliphatic carboxylic acids having 3 to 8 carbon atoms, copolymers of ethylene with such esters, and partially saponified polymers thereof; and H. copolymers of (B) in which all or part of the alpha-olefin has been replaced with styrene or alkyl styrene, where the alkyl group has 1 or 2 carbon atoms.

15. The process of claim 14 in which the shear viscosity of the second polymer is 5–15% of that of the polyolefin.

16. The process of claim 14 in which the second polymer is a polymer (A).

17. The process of claim 14 in which the second polymer is a polymer of (B).

18. The process of claim 14 in which the second polymer is a polymer of (C).

19. The process of claim 14 in which the second polymer is a polymer of (D).

20. The process of claim 14 in which the second polymer is a polymer of (E).

21. The process of claim 14 in which the second polymer is polyme of (F).

22. The process of claim 14 in which the second polymer is a polymer of (G).

23. The process of claim 14 in which the second polymer is a polymer of (H).

24. The process of claim 14 in which the ratio of the polyethylene to the second polymer is in the range of from 50:1 to 100:1.

25. The process of claim 14 in which the fabrication apparatus is a melt-extruder.

26. The process of claim 25 in which the rate of extrusion of polethylene is higher than the rate would be for extrusion of the same polyethylene in the absence of the composition of the second polymer containing a cross-linking agent.

27. The process of claim 26 in which the process is a blown film process.

28. The mixture of claim 1 in which the cross-linking agent incorporated in the second polymer is an organic peroxide selected from those in which the cross linking reaction occurs above the melting point of said second polymer.

29. The mixture of claim 28 in which the organic peroxide is selected from the group consisting of 2,5-dimethyl-2,5-bis(tert. butyl peroxyisopropyl) benzene and 2,5-diemthyl-2,5-di(t-butylperoxy)hexyne-3.

30. The mixture of claim 1 in which, in addition to the cross-linking agent there is incorporated with the composition of the second polymer a modifying agent which undergoes a chemical reaction at temperatures at which polyethylene is in a molten state, said modifying agent being selected from the group consisting of co-curing agents, unsaturated organic acids, cross-linkable silane compounds and sulphur trioxide-trimethylamine.

* * * * *